(12) United States Patent
Zhu et al.

(10) Patent No.: US 11,862,150 B2
(45) Date of Patent: Jan. 2, 2024

(54) SKILL DISPATCHING METHOD AND APPARATUS FOR SPEECH DIALOGUE PLATFORM

(71) Applicant: AI SPEECH CO., LTD., Jiangsu (CN)

(72) Inventors: Chengya Zhu, Jiangsu (CN); Shuai Fan, Jiangsu (CN); Weisi Shi, Jiangsu (CN)

(73) Assignee: AI SPEECH CO., LTD., Jiangsu (CN)

( * ) Notice: Subject to any disclaimer, the term of this patent is extended or adjusted under 35 U.S.C. 154(b) by 0 days.

(21) Appl. No.: 17/757,907

(22) PCT Filed: Nov. 18, 2020

(86) PCT No.: PCT/CN2020/129703
§ 371 (c)(1),
(2) Date: Jun. 23, 2022

(87) PCT Pub. No.: WO2021/129240
PCT Pub. Date: Jul. 1, 2021

(65) Prior Publication Data
US 2023/0044968 A1 Feb. 9, 2023

(30) Foreign Application Priority Data

Dec. 26, 2019 (CN) .......................... 201911364193.8

(51) Int. Cl.
*G10L 15/00* (2013.01)
*G10L 15/18* (2013.01)
(Continued)

(52) U.S. Cl.
CPC ...... *G10L 15/1815* (2013.01); *G10L 15/1822* (2013.01); *G10L 15/22* (2013.01); *G10L 15/30* (2013.01); *G10L 15/08* (2013.01)

(58) Field of Classification Search
CPC combination set(s) only.
See application file for complete search history.

(56) References Cited

U.S. PATENT DOCUMENTS

| 8,214,344 B2 | 7/2012 | Kruglick |
| 8,495,051 B2 | 7/2013 | Kruglick |
| (Continued) |

FOREIGN PATENT DOCUMENTS

| CN | 103168298 A | 6/2013 |
| CN | 108874766 B | 11/2018 |
| (Continued) |

OTHER PUBLICATIONS

International Search Report and Written Opinion dated Feb. 20, 2021, in connection with International Patent Application No. PCT/CN2020/129703, filed Nov. 18, 2020, 11 pgs. (including translation).

(Continued)

*Primary Examiner* — Vu B Hang
(74) *Attorney, Agent, or Firm* — Chiesa Shahinian & Giantomasi PC

(57) ABSTRACT

A skill dispatching method for a speech dialogue platform including: receiving, by a central control dispatching service, a semantic result of recognizing a user's voice sent by a data distribution service; dispatching, by the central control dispatching service, a plurality of skill services related to the semantic result in parallel, and obtaining skill parsing results from the plurality of skill services; sorting the skill parsing results based on priorities of the skill services, and exporting a result with the highest priority to a skill realization discrimination service; when failure in realization, selecting a result with the highest priority among the rest of skill parsing results and exporting the same to the skill realization discrimination service, and when success in realization, sending the result with the highest priority to the data distribution service for feedback to the user. The method improves skill dispatching efficiency, reduces delay, and improves user experience.

16 Claims, 2 Drawing Sheets

(51) Int. Cl.
*G10L 15/30* (2013.01)
*G10L 15/22* (2006.01)
*G10L 15/08* (2006.01)

(56) References Cited

U.S. PATENT DOCUMENTS

| | | |
|---|---|---|
| 8,521,766 B1 | 8/2013 | Hoarty |
| 9,201,970 B2 | 12/2015 | Kruglick |
| 10,380,206 B2 | 8/2019 | Kruglick |
| 11,016,968 B1 * | 5/2021 | Hoover .................. G10L 15/22 |
| 11,069,351 B1 * | 7/2021 | Menon .................. G06F 40/30 |
| 11,289,075 B1 * | 3/2022 | Pandey .................. G06F 3/167 |
| 11,455,987 B1 * | 9/2022 | Dabas .................... G06F 3/167 |
| 2011/0231379 A1 | 9/2011 | Kruglick |
| 2012/0233146 A1 | 9/2012 | Kruglick |
| 2013/0282692 A1 | 10/2013 | Kruglick |
| 2016/0004780 A1 | 1/2016 | Kruglick |
| 2018/0330730 A1 | 11/2018 | Garg et al. |
| 2019/0243669 A1 * | 8/2019 | Gupta .................... G10L 15/26 |

FOREIGN PATENT DOCUMENTS

| | | |
|---|---|---|
| CN | 109710137 A | 5/2019 |
| CN | 109858975 A | 6/2019 |
| CN | 110196732 A | 9/2019 |
| CN | 110209392 A | 9/2019 |
| CN | 111161717 A | 5/2020 |
| CN | 107615276 B | 5/2021 |
| EP | 3564831 A1 | 11/2019 |
| KR | 20100067727 A | 6/2010 |

OTHER PUBLICATIONS

Search Report dated Feb. 15, 2022, in connection with Chinese Patent Application No. 2019113641938, 5 pgs. (including translation).
Full English translation of the International Written Opinion dated Feb. 20, 2021, in connection with International Patent Application No. PCT/CN2020/129703, 4 pgs.
Extended European Search Report dated May 17, 2023 in connection with European Patent Application No. 20907147.1, filed Nov. 18, 2020, 9 pgs.

* cited by examiner

SKILL DISPATCHING METHOD AND APPARATUS FOR SPEECH DIALOGUE PLATFORM

CROSS-REFERENCE TO RELATED APPLICATIONS

This application is a national stage of International Patent Application Serial No. PCT/CN2020/129703, filed Nov. 18, 2020, which claims priority to Chinese Patent Application No. 201911364193.8, filed Dec. 26, 2019; the disclosures of all are incorporated herein by reference in their entirety.

TECHNICAL FIELD

The present invention relates to the field of intelligent speech, in particular to a skill dispatching method and apparatus for a speech dialogue platform.

BACKGROUND

A speech product generally contains various skills (navigation, music, radio, etc.), and a corresponding skill is selected according to a semantic classification and parsing result of a speech input by a user.

In a certain speech product containing QQ Music and Netease Music, after a semantic classification directs to the QQ Music skill, if content cannot be found or is not copyrighted, the dispatching will be performed in the Netease Music skill according to a semantic classification dispatching strategy so as to complete the search.

In the process of achieving the present invention, the inventors found that there are at least the following problems in the related art.

Skill dispatching is handled by the central control dispatching service of the speech dialogue platform. If content searched by user is relatively unpopular, there is no corresponding content in some commonly used skills. In this case, the central control dispatching service needs to repeatedly schedule skills for the search of the user to query the corresponding content. When the central dispatching service receives a large number of user requests, it needs to perform a large number of dispatching processing. In this case, the delay will be significant, causing a low efficiency of feedback to the user.

SUMMARY

In order to at least solve the problems in the prior art that if the central control dispatching service receives a large number of user requests, the central control dispatching service may require a large number of dispatching due to unpopularity of resources requested by users, resulting in network delay and low feedback efficiency.

In a first aspect, an embodiment of the present invention provides a skill dispatching method for a speech dialogue platform, including:

receiving, by a central control dispatching service, a semantic result of recognizing a user's voice sent by a data distribution service;

dispatching in parallel, by the central control dispatching service, a plurality of skill services related to the semantic result, and obtaining skill parsing results fed back by the plurality of skill services;

sorting the skill parsing results based on priorities of the skill services, and exporting the skill parsing result with the highest priority to a skill realization discrimination service, for judging whether the skill parsing result with the highest priority is capable of realizing the function of the semantic result;

when the skill realization discrimination service feeds back a failed realization, selecting a skill parsing result with the highest priority among the rest skill parsing results and exporting the same to the skill realization discrimination service, and when the skill realization discrimination service feeds back a successful realization, sending the skill parsing result with the highest priority to the data distribution service for feedback to the user.

In a second aspect, an embodiment of the present invention provides a skill dispatching apparatus for a speech dialogue platform, including:

a semantic receiving program module configured to receive, by a central control dispatching service, a semantic result of recognizing a user's voice sent by a data distribution service;

a skill parsing program module configured to schedule in parallel, by the central control dispatching service, a plurality of skill services related to the semantic result, and obtain skill parsing results fed back by the plurality of skill services;

a skill realization identifying program module configured to sort the skill parsing results based on priorities of the skill services, and export a skill parsing result with the highest priority to a skill realization discrimination service, for judging whether the skill parsing result with the highest priority is capable of realizing the function of the semantic result;

a scheduler module configured to, when the skill realization discrimination service feeds back a failed realization, select a skill parsing result with the highest priority among the rest of skill parsing results and export the same to the skill realization discrimination service, and when the skill realization discrimination service feeds back a successful realization, send the skill parsing result with the highest priority to the data distribution service for feedback to the user.

In a third aspect, an electronic device is provided, including: at least one processor, and a memory communicatively coupled to the at least one processor, wherein the memory stores instructions executable by the at least one processor, the instructions being executed by the at least one processor to enable the at least one processor to perform the steps of the skill dispatching method for a speech dialogue platform according to any embodiment of the present invention.

In a fourth aspect, a storage medium on which a computer program is stored is provided, wherein the program, when being executed by a processor, perform the steps of the skill dispatching method for a speech dialogue platform according to any embodiment of the present invention.

The beneficial effects of the embodiments of the present invention lie in that a semantic recognition result is sent in parallel to a plurality of skill services, and parsing results of the various skill service are sent to a skill realization discrimination service for sequential discrimination. Only one dispatching between the central control dispatching service and the skill services is needed to determine a parsing result of the speech skill that can meet a user needs, which reduces the number of times of dispatching between the central control dispatching service and the skill services. Even when a large number of users send requests, the efficiency of skill dispatching can be ensured, delay can be reduced, and user experience can be improved.

BRIEF DESCRIPTION OF THE DRAWINGS

In order to explain the technical solutions of the embodiments of the present disclosure more clearly, the drawings that need to be used in the description of the embodiments will be briefly introduced hereinafter. Obviously, the drawings in the following description are some embodiments of the present disclosure. Those of ordinary skill in the art can also obtain other drawings based on these drawings without creative work.

DETAILED DESCRIPTION

In order to make the objectives, technical solutions and advantages of the embodiments of the present invention clearer, the technical solutions in the embodiments of the present invention will be described clearly and completely below with reference to the accompanying drawings in the embodiments of the present invention. Obviously, the described are merely some but not all of the embodiments of the present invention. Based on the embodiments of the present invention, all other embodiments obtained by ordinary skilled in the art without inventive efforts shall fall within the scope of the present invention.

Figure 1:
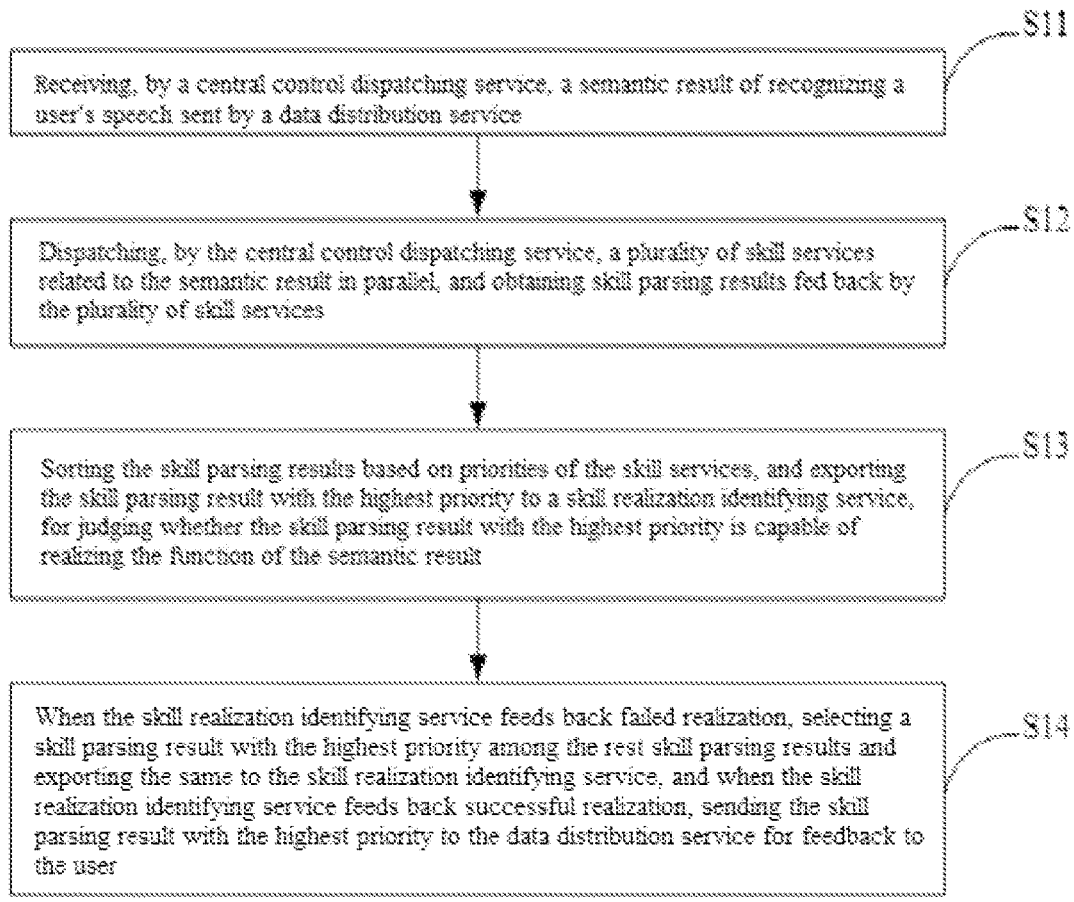
FIG. 1 is a flowchart of a skill dispatching method for a speech dialogue platform according to an embodiment of the present invention.

FIG. 1 is a flowchart of a skill dispatching method for a speech dialogue platform according to an embodiment of the present invention. The method is applied to a server and includes the following steps.

In S11, a central control dispatching service receives a semantic result of recognizing a user's speech sent by a data distribution service.

In S12, the central control dispatching service schedules a plurality of skill services related to the semantic result in parallel, and obtains parsing results fed back by the plurality of skill services.

In S13, the plurality of parsing results are sorted based on priorities of the skill services, and the skill parsing result with the highest priority is exported to a skill realization discrimination service for judging whether the skill parsing result with the highest priority is capable of realizing the function of the semantic result.

In S14, when the skill realization discrimination service feeds back a failed realization, a skill parsing result with the highest priority is selected among the rest of skill parsing results and exported to the skill realization discrimination service, and when the skill realization discrimination service feeds back a successful realization, the skill parsing result with the highest priority is sent to the data distribution service for feedback to the user.

In this embodiment, when a user uses a smart device, he/she will have a dialogue with a smart device, such as "play XX song" or "ask XX question". The smart device sends the collected speech to the data distribution service. The speech is sent to the recognition service for semantic recognition through the data distribution service. The data distribution service obtains the semantic result of the user's speech and sends the semantic result to the central control dispatching service.

In step S11, the central control dispatching service receives the semantic recognition result of the user's speech sent by the data distribution service, for example, "play XX song".

In step S12, upon receiving the semantic recognition result, the central control dispatching service does not send it directly to one skill service, but schedules a plurality of skill services related to the semantic result in parallel, and sends the semantic result in parallel to the plurality of skill services related to the semantic result simultaneously. In this case, the central control dispatching service will receive parsing results fed back by the plurality of skill services. The central control dispatching service sends "play XX song" to a plurality of related skill services in parallel, such as QQ Music, NetEase Cloud Music, Kugou Music, Kuwo Music, Xiami Music, etc. and receives parsing results fed back by the speech skills.

In a conventional method, a determined semantic recognition result is directly sent to the skill service with the highest priority. If the skill service cannot realize the function of the semantic result, the central control dispatching service needs to re-send the semantic recognition result to other skill services. Such a dispatching method requires incessant trying by the central control dispatching service, and the efficiency is low.

In step S13, since different skills have different priorities in a speech product design stage, the skill parsing result with the highest priority is first exported to the skill realization discrimination service to judge whether the skill with the highest priority is capable of realizing the function of the semantic result. For example, the semantic result is "play 'This is love'", and various skills return corresponding parsing results. In this case, the skill with the first priority is QQ Music. The parsing result of the QQ Music skill is exported to the skill realization discrimination service.

In step S14, when the skill realization discrimination service feeds back a failed realization, for example, there is no original edition of the song 'This is love' in QQ Music and the user's needs cannot be met, then a skill parsing result with the highest priority is selected among the rest of skill parsing results and exported to the skill realization discrimination service. For example, if the skill with the highest priority is NetEase Cloud Music in this case, the parsing result of the NetEase Cloud Music skill will be exported to the skill realization discrimination service.

When the skill realization discrimination service feeds back a successful realization, it means that the song 'This is love'" is available in NetEase Cloud Music. The parsing result of the NetEase Cloud Music skill is sent to the data distribution service for feedback to the user.

It can be seen from this embodiment that sending the semantic recognition result to a plurality of skill services in parallel and sending the parsing results of various skill services to the skill realization discrimination service for sequential discrimination merely requires one dispatching between the central control dispatching service and the skill services to determine the parsing result of the speech skill which can meet the user's needs, reducing the number of times of dispatching between the central control dispatching service and the skill services. Even when a large number of users send requests, the efficiency of skill dispatching can be ensured, delay can be reduced, and user experience can be improved.

As an implementation, in this embodiment, the skill realization discrimination service includes:

receiving the skill parsing result with the highest priority sent by the central control dispatching service; and performing dialogue state tracking on the skill parsing result, and judging whether the skill parsing result is capable of realizing the function of the semantic result based on the determined dialog state.

In this embodiment, the skill realization discrimination service determines the corresponding dialog state by performing dialog state tracking on the skill parsing result, thereby judging whether the skill parsing result is capable of realizing the function of the semantic result. For example, it can be applied to some search skills except music skills. Due to the differences among various search engines, when the same keyword is entered, different search results may be acquired. Some search skills are good at searching for gossip-type information, and some search skills are good at searching for academic-type information. The dialogue states obtained by the dialogue state tracking are also different, and therefore whether the parsing results of different skills can realize the function of the semantic result can be judged.

It can be seen from this embodiment that the implementation of providing skill realization discrimination can ensure that the content fed back is the content expected by the user, thereby further improving user experience.

As an implementation, in this embodiment, the priority includes at least skill priority and context priority.

Context priority may be interpreted in the following manner. For example, an A-engine search skill is good at searching for gossip information, and a B-engine search skill is good at searching for academic information. Considering that users may not ask academic questions very often, the A-engine search skill is given priority over the B-engine search skill. When a user inputs an academic question request in the first round of dialogue, the academic question request may be sent to the A-engine search skill and the B-engine search skill in parallel simultaneously according to the above method. Priority is given to judging whether the parsing result of the A-engine's search skills can meet the user's needs. If it is determined that the A-engine search skill cannot meet the user's needs but the B-engine search skill can, the parsing result of the B-engine search skill is fed back to the user. The user asks another academic-type question in the second round of dialogue. In this case, it is determined according to the context that the B-engine search skill in the first round of dialogue can meet the user's needs, so the B-engine search skill will be given priority in the second round of dialogue.

It can be seen that in this embodiment, a variety of priority discrimination methods are provided, the dispatching logic is further optimized, and the skill dispatching efficiency is improved.

Figure 2:
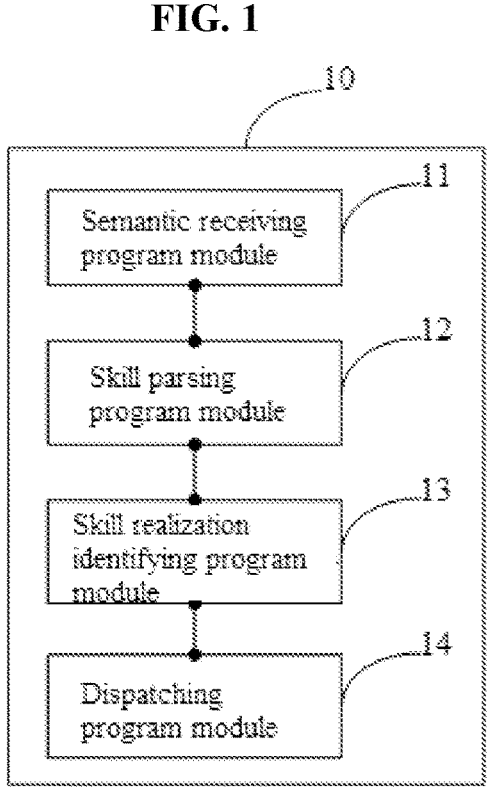
FIG. 2 is a schematic structural diagram of a skill dispatching apparatus for a speech dialogue platform according to an embodiment of the present invention.

FIG. 2 is a schematic structural diagram of a skill dispatching apparatus for a speech dialogue platform according to an embodiment of the present invention. The apparatus may perform the skill dispatching method for a speech dialogue platform in any of the above embodiments, and is configured in a terminal.

The skill dispatching apparatus for a speech dialogue platform according to this embodiment includes a semantic receiving program module 11, a skill parsing program module 12, a skill realization identifying program module 13 and a dispatching program module 14.

The semantic receiving program module 11 is configured to receive, by a central control dispatching service, a semantic result of recognizing a user's speech sent by a data distribution service. The skill parsing program module 12 is configured to schedule, by the central control dispatching service, a plurality of skill services related to the semantic result in parallel, and obtain skill parsing results fed back by the plurality of skill services. The skill realization identifying program module 13 is configured to sort the skill parsing results by priorities of the skill services, and export a skill parsing result with the highest priority to a skill realization discrimination service for judging whether the skill parsing result with the highest priority is capable of realizing the function of the semantic result. The scheduler module 14 is configured to, when the skill realization discrimination service feeds back a failed realization, select another skill parsing result with the highest priority among the rest of skill parsing results and export the same to the skill realization discrimination service, and when the skill realization discrimination service feeds back a successful realization, send the skill parsing result with the highest priority to the data distribution service for feedback to the user.

The skill realization discriminator module is configured to:

receive the skill parsing result with the highest priority sent by the central control dispatching service; and perform dialogue state tracking on the skill parsing result, and judging whether the skill parsing result is capable of realizing the function of the semantic result based on the determined dialog state.

Further, the priority includes at least a skill priority and a context priority.

Further, the skill service includes a question-and-answer skill service and a task-based skill service.

An embodiment of the present invention further provides a non-volatile computer storage medium storing computer-executable instructions which are capable of performing the skill dispatching method for a speech dialogue platform in any of the above method embodiments.

As an implementation, the computer-executable instructions stored in the non-volatile computer storage medium according to the present invention can be set so that, a central control dispatching service receives a semantic result of recognizing a user's speech sent by a data distribution service;

the central control dispatching service schedules in parallel a plurality of skill services related to the semantic result and obtains skill parsing results fed back by the plurality of skill services;

the skill parsing results are sorted based on priorities of the skill services, and the skill parsing result with the highest priority is exported to a skill realization discrimination service for judging whether the skill parsing result with the highest priority is capable of realizing the function of the semantic result;

when the skill realization discrimination service feeds back a failed realization, another skill parsing result with the highest priority among the rest of the skill parsing results is selected and exported to the skill realization discrimination service, and when the skill realization discrimination service feeds back a successful realization, the skill parsing result with the highest priority is sent to the data distribution service for feedback to the user.

As a non-volatile computer-readable storage medium, it may store non-volatile software programs, non-volatile computer-executable programs, and modules, such as program instructions/modules corresponding to the methods in the embodiments of the present invention. One or more program instructions are stored in the non-volatile computer-readable storage medium, and when being executed by a processor, perform the skill dispatching method for a speech dialogue platform in any of the above method embodiments.

The non-volatile computer-readable storage medium may include a program storage area and a data storage area. The program storage area may store an operating system and an application program required for at least one function. The data storage area may store data created according to the use of the device and the like. In addition, the non-volatile computer-readable storage medium may include a high-speed random access memory, and may also include a non-volatile memory, such as at least one magnetic disk storage device, a flash memory device, or other non-volatile solid-state storage device. In some embodiments, the non-volatile computer-readable storage medium may optionally include memories located remotely from the processor, which may be connected to the device through a network. Examples of such networks include, but are not limited to, the Internet, an intranet, a local area network, a mobile communication network, and combinations thereof.

An embodiment of the present invention also provides an electronic device, including at least one processor and a memory communicatively coupled to the at least one processor. The memory stores instructions executable by the at least one processor to enable the at least one processor to enable:

receiving, by a central control dispatching service, a semantic result of recognizing a user's speech sent by a data distribution service;

dispatching, by the central control dispatching service, a plurality of skill services related to the semantic result in parallel, and obtaining skill parsing results fed back by the plurality of skill services;

sorting the skill parsing results based on priorities of the skill services, and exporting the skill parsing result with the highest priority to a skill realization discrimination service for judging whether the skill parsing result with the highest priority is capable of realizing the function of the semantic result;

when the skill realization discrimination service feeds back a failed realization, selecting the skill parsing result with the highest priority among the rest of skill parsing results and exporting the same to the skill realization discrimination service, and when the skill realization discrimination service feeds back a successful realization, sending the skill parsing result with the highest priority to the data distribution service for feedback to the user.

In some embodiments, the skill realization identifying service includes: receiving the skill parsing result with the highest priority sent by the central control dispatching service; and performing dialogue state tracking on the skill parsing result, and judging whether the skill parsing result is capable of realizing the function of the semantic result based on the determined dialog state.

In some embodiments, the priority includes at least skill priority and context priority.

In some embodiments, the skill service includes a question-and-answer skill service and a task-based skill service.

Figure 3:
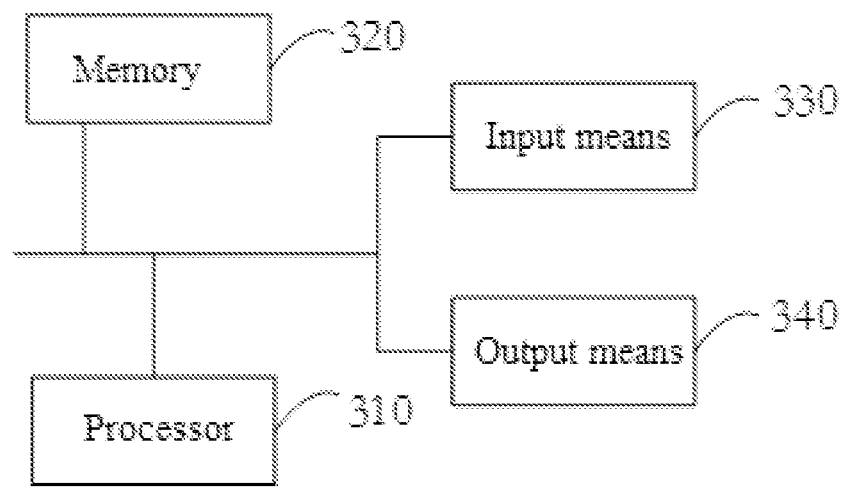
FIG. 3 is a schematic structural diagram of an electronic device according to an embodiment of the present invention.

FIG. 3 is a schematic diagram of a hardware structure of an electronic device for performing a skill dispatching method for a speech dialogue platform according to another embodiment of the present invention. As shown in FIG. 3, the device includes:

one or more processors 310 and a memory 320, in which one processor 310 is taken as an example in FIG. 3.

The apparatus for performing the skill dispatching method for a speech dialogue platform may further include an input means 330 and an output means 340.

Processors 310, memory 320, input means 330 and output means 340 may be connected through a bus or in other ways. In FIG. 3, bus is used as an example.

Memory 320 is a non-volatile computer-readable storage medium, which may store non-volatile software programs, non-volatile computer-executable programs and modules, such as program instructions/modules corresponding to the skill dispatching method for a speech dialogue platform in the embodiment of the present invention. Processor 310 executes various functional applications and data processing of a server by running the non-volatile software programs, instructions and modules stored in the memory 320 to implement the skill dispatching method for a speech dialogue platform in the above method embodiments.

Memory 320 may include a program storage area and a data storage area. The program storage area may store an operating system and an application program required for at least one function. The data storage area may store data created according to the use of the device and the like. In addition, memory 320 may include a high-speed random access memory, and may also include a non-volatile memory, such as at least one magnetic disk storage device, a flash memory device, or other non-volatile solid-state storage device. In some embodiments, memory 320 may optionally include memories located remotely from processor 310, which may be connected to the skill dispatching apparatus for a speech dialogue platform through a network. Examples of such networks include, but are not limited to, the Internet, an intranet, a local area network, a mobile communication network, and combinations thereof.

Input means 330 may receive input numerical or character information, and generate signals related to user settings and function control of the skill dispatching apparatus for a speech dialogue platform. Output means 340 may include a display device such as a display screen.

One or more modules are stored in memory 320, and when being executed by one or more processors 310, perform the skill dispatching for a speech dialogue platform in any of the above method embodiments.

The electronic device in the embodiments of the present application exists in various forms, including but not limited to:

(1) Mobile communication device which features in its mobile communication function and the main goal thereof is to provide voice and data communication, such as smart phones (such as iPhone), multimedia phones, functional phones, and low-end phones;

(2) Ultra-mobile personal computer device which belongs to the category of personal computers and has computing and processing functions and generally mobile Internet access capability, such as PDA, MID and UMPC devices, e.g., iPad;

(3) Portable entertainment devices which can display and play multimedia content, such as audio and video players (such as iPod), handheld game consoles, e-books, and smart toys and portable car navigation devices; and (4) Other electronic devices with data interaction function.

It should be noted that in this specification, terms such as first and second are used only to distinguish one entity or operation from another entity or operation, and do not necessarily require or imply there is any such actual relationship or order among these entities or operations. Moreover, terms such as "including" and "comprising" shall mean that not only those elements described, but also other elements not explicitly listed, or elements inherent to the described processes, methods, objects, or devices, are included. In the absence of specific restrictions, elements defined by the phrase "comprising . . . " do not mean excluding other identical elements from process, method, article or device involving these mentioned elements.

The device embodiments described above are only exemplary. The units described as separate components may or may not be physically separated, and the components displayed as units may or may not be physical units, that is, may be located in one place, or it can be distributed to multiple network elements. Some or all of the modules may be selected according to actual needs to achieve the object of the solution of this embodiment.

Through the description of the above embodiments, those skilled in the art can clearly understand that each embodiment can be implemented by means of software plus a common hardware platform, and of course, it can also be implemented by hardware. Based on this understanding, the above technical solutions can essentially be embodied in the form of software products that contribute to related technologies, and the computer software products can be stored in computer-readable storage media, such as ROM/RAM, magnetic disks, CD-ROM, etc., including several instructions to enable a computer device (which may be a personal computer, server, or network device, etc.) to perform the method described in each embodiment or some parts of the embodiment.

Finally, it should be noted that the above embodiments are only used to illustrate the technical solutions of the present application, rather than limitation. Although the present application has been described in detail with reference to the foregoing embodiments, those skilled in the art should understand that the technical solutions described in the foregoing embodiments can be modified, or some of the technical features can be equivalently replaced without deviating from the spirit and scope of the technical solutions of the embodiments of the present application.

What is claimed is:

1. A skill dispatching method for a speech dialogue platform, applied to a server, the method comprising:
    receiving, by a central control dispatching service, a semantic result of recognizing a user's speech sent by a data distribution service;
    dispatching in parallel, by the central control dispatching service, a plurality of skill services related to the semantic result, sending the semantic result in parallel to the plurality of skill services related to the semantic result simultaneously, and obtaining skill parsing results fed back by the plurality of skill services;
    sorting the skill parsing results based on priorities of the skill services, and exporting a skill parsing result with the highest priority to a skill realization discrimination service for judging whether the skill parsing result with the highest priority is capable of realizing the function of the semantic result;
    when the skill realization discrimination service feeds back a successful realization, sending the skill parsing result with the highest priority to the data distribution service for feedback to the user, and
    when the skill realization discrimination service feeds back a failed realization, selecting a skill parsing result with the highest priority among the rest of skill parsing results and exporting the same to the skill realization discrimination service.

2. The method according to claim 1, wherein the skill realization identifying service comprises:
    receiving the skill parsing result with the highest priority sent by the central control dispatching service; and
    performing dialogue state tracking on the skill parsing result, and judging whether the skill parsing result is capable of realizing the function of the semantic result based on the determined dialog state.

3. The method according to claim 1, wherein the priority comprises at least skill priority and context priority.

4. The method according to claim 1, wherein the skill service comprises a question-and-answer skill service and a task-based skill service.

5. A skill dispatching apparatus for a speech dialogue platform, comprising:
    a semantic receiving program module configured to receive, by a central control dispatching service, a semantic result of recognizing a user's speech sent by a data distribution service;
    a skill parsing program module configured to schedule, by the central control dispatching service, a plurality of skill services related to the semantic result in parallel, send the semantic result in parallel to the plurality of skill services related to the semantic result simultaneously, and obtain skill parsing results fed back by the plurality of skill services;
    a skill realization identifying program module configured to sort the skill parsing results based on priorities of the skill services, and export the skill parsing result with the highest priority to a skill realization discrimination service, for judging whether the skill parsing result with the highest priority is capable of realizing the function of the semantic result;
    a scheduler module configured to, when the skill realization discrimination service feeds back a successful realization, send the skill parsing result with the highest priority to the data distribution service for feedback to the user, and when the skill realization discrimination service feeds back a failed realization, select a skill parsing result with the highest priority among the rest of skill parsing results and export the same to the skill realization discrimination service.

6. The apparatus according to claim 5, wherein the skill realization discrimination program module is configured to:
    receive the skill parsing result with the highest priority sent by the central control dispatching service; and
    perform dialogue state tracking on the skill parsing result, and judge whether the skill parsing result is capable of realizing the function of the semantic result based on the determined dialog state.

7. The apparatus according to claim 5, wherein the priority comprises at least skill priority and context priority.

8. The apparatus according to claim 5, wherein the skill service comprises a question-and-answer skill service and a task-based skill service.

9. An electronic device comprising at least one processor and memory communicatively coupled to the at least one processor, wherein the memory stores instructions executable by the at least one processor, the instructions being executed by the at least one processor to enable the at least one processor to perform the steps of the method of claim 1.

10. A non-transitory storage medium on which a computer program is stored, wherein the program, when being executed by a processor, performs the steps of the method of claim 1.

11. The electronic device according to claim 9, wherein the skill realization identifying service comprises:
   receiving the skill parsing result with the highest priority sent by the central control dispatching service; and
   performing dialogue state tracking on the skill parsing result, and judging whether the skill parsing result is capable of realizing the function of the semantic result based on the determined dialog state.

12. The electronic device according to claim 9, wherein the priority comprises at least skill priority and context priority.

13. The electronic device according to claim 9, wherein the skill service comprises a question-and-answer skill service and a task-based skill service.

14. The storage medium according to claim 10, wherein the skill realization identifying service comprises:
   receiving the skill parsing result with the highest priority sent by the central control dispatching service; and
   performing dialogue state tracking on the skill parsing result, and judging whether the skill parsing result is capable of realizing the function of the semantic result based on the determined dialog state.

15. The storage medium according to claim 10, wherein the priority comprises at least skill priority and context priority.

16. The storage medium according to claim 10, wherein the skill service comprises a question-and-answer skill service and a task-based skill service.

\* \* \* \* \*